US 6,507,908 B1
United States Patent
Caronni

(10) Patent No.: US 6,507,908 B1
(45) Date of Patent: Jan. 14, 2003

(54) SECURE COMMUNICATION WITH MOBILE HOSTS

(75) Inventor: Germano Caronni, Sunnyvale, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/262,191

(22) Filed: Mar. 4, 1999

(51) Int. Cl.[7] .............................. H04L 9/32; H04L 12/66; H04Q 7/22

(52) U.S. Cl. ...................... 713/153; 713/151; 713/162; 380/248; 380/270; 709/225; 455/412; 455/433; 455/445; 370/389

(58) Field of Search ................................. 713/151, 153, 713/156, 158, 162, 168, 170, 175, 176, 178, 202, 160; 380/33, 248, 270; 709/218, 219, 225, 229, 230, 238; 370/351, 352, 389; 455/412, 428, 432, 433, 445

(56) References Cited

U.S. PATENT DOCUMENTS

| | | | |
|---|---|---|---|
| 5,148,479 A | 9/1992 | Bird et al. ..................... 380/23 |
| 5,159,592 A | 10/1992 | Perkins ....................... 370/85.7 |
| 5,568,202 A | * 10/1996 | Koo ............................. 348/611 |
| 5,946,615 A | * 8/1999 | Holmes et al. .............. 455/412 |
| 6,347,085 B2 | * 2/2002 | Kelly .......................... 370/352 |
| 6,353,614 B1 | * 3/2002 | Borella et al. .............. 370/389 |

FOREIGN PATENT DOCUMENTS

| | | | |
|---|---|---|---|
| EP | 0 483 547 A | 8/1996 | .......... H04L/12/56 |
| EP | 0 840 482 A | 6/1998 | .......... H04L/12/66 |

OTHER PUBLICATIONS

B. Schneier, "Applied Cryptography Second Edition: Protocols, Algorithms, and Source Code in C," John Wiley & Sons, Inc., Oct. 18, 1995, pp. 185–187, 574–577.*
A.J. Menezes et al., "Handbook of Applied Cryptography," CRC Press, Oct. 16, 1996, pp. 576–577.*
Article Entitled "IP Mobility Support" by C. Perkins, Oct. 1996, pp. 1–68.
Article Entitled "Rapid Authentication for Mobile IP" by Luis A. Sanchez et al, Nov. 21, 1997, pp. 1–21.
Article Entitled "Security Architecture for the Internet Protocol" by S. Kent, Jul. 1998, pp. 1–54.
Perkins, Charles E. and Luo, Kevin, Using DHCP with computers that move, J.C. Baltzer AG. Science Publishers, Oct. 1, 1995, vol. 1, No. 3, Amsterdam, NL, pp. 341–353.

* cited by examiner

Primary Examiner—Justin T. Darrow
(74) Attorney, Agent, or Firm—Stuart T. Langley; William J. Kubida; Hogan & Hartson LLP

(57) ABSTRACT

A method for secure data communication with a mobile machine in which a data packet is received from the mobile machine having a particular network address. A pool of secure addresses is established and a data structure is created to hold address translation associations. Each association is between a particular network address and a particular one of the secure addresses. If the received data packet is a secure data packet an association between the received data packet's network address and a secure address in the data structure is identified and the data packet's network address is translated to the associated secure address before forwarding the data packet on to higher network protocol layers. When the received data packet is not secure it is passed it on without address translation to the higher network protocol layers. For outgoing packets addressed to a secure address, the secure address is translated to a real network address (e.g., IPv4 or IPv6 addresses) and the packet payload is encrypted. Outgoing packets that are addressed directly to real network addresses pass through in a conventional manner.

24 Claims, 5 Drawing Sheets

SECURE COMMUNICATION WITH MOBILE HOSTS

BACKGROUND OF THE INVENTION

1. Field of the Invention

The present invention relates, in general, to secure communications, and, more particularly, to secure data communications with a mobile computer over an insecure network.

2. Relevant Background

A typical computing environment includes a secure network, such as a local area network (LAN) or wide area network (WAN) that can only be accessed by computers that are authorized by the network administrator to have access. These networks are non-public and so security can be readily controlled with conventional password management techniques. Mobile users can access the network through, for example, dial-up connections through server or gateway that verifies the user's identity and access privileges.

An important use of the Internet and other public data communication networks is the ability to exchange data between mobile computers and an organization's secure internal network. However, the public network is not secure. An internal secure network uses a gateway machine or "firewall" to couple the internal network to the external insecure network. A firewall is a hardware and/or software system designed to prevent unauthorized access to or from a private network. A firewall examines all packets entering and exiting the private network and blocks those that fail to meet specified security criteria. In an Internet environment, the gateway performs security operations on the IP layer by using, for example SunScreen™ SKIP, (SunScreen is a trademark of Sun Microsystems, Inc.). SKIP is a public key certificate-based key-management scheme which provides key-management for Internet protocols. Data communications using a secure gateway in this manner are referred to as "secure IP".

All external hosts must be able to communicate with the internal network using secure IP at any time, but must also be allowed to reach the internal network while transmitting in the clear. This is useful if some services on the internal network must be accessible by the general public (e.g., web server or software download access) and by privileged users such as employees which may have additional rights on those services, e.g., downloading proprietary information. Because of this, a gateway device cannot always provide authorization control simply by filtering out transmissions received in the clear.

Prior secure IP systems provide authorization control using access control lists (ACLs) that list each IP network address (or other unique network identifier) that is authorized to access a particular resource on the internal network. In general, a gateway can place a static IP address on its ACL and authorize communication from that address to access services on the internal secure network. While this system addresses some problems related to access control, it does not authenticate that the received data packet truly originated from a particular machine.

A particular difficulty arises in that hosts coupled to the external network may be both regular "static" Internet nodes (i.e., having a permanently assigned IP address) or mobile nodes (i.e., nodes having a dynamically assigned IP address). It is also possible for a host with a static address to be in secure mode at some time, and be in a clear mode at some other time (e.g., the host running Windows(™) and Unix at different times). Moreover, two mobile hosts with different security properties may appear under the same dynamically assigned IP address at different times. In these instances merely relying on authorization based on the incoming packet's IP address is insufficient. The gateway machine must be able to authenticate or verify that data received from a remote system truly originated from that system. This situation must be correctly handled by the gateway to prevent, for example, hijacking of TCP connections.

For example, when an outside machine using secureIP disconnects from the Internet, thereby relinquishing its IP address, it can be replaced by a second machine transmitting in the clear that has been assigned the first machine's IP address. From the secure network's perspective, the incoming TCP packets may have come from either a second machine using the first machine's IP address, or from the first machine that is now sending in the clear. The second machine will not be able to break the secureIP security, but it may be able to send data in the clear that will reach the internal network. Desirably, the gateway must detect the difference between these two situations, and hinder the second machine's attempts to send packets on behalf of the old machine. At the same time, the gateway must not allow the fallback to clear text to be abused by an enemy to force all communication to go on in the clear. However, the incoming IP packets do not identify any machine-specific information that would enable the gateway to distinguish between the first machine and the second machine using the same IP address.

Many proposed approaches to mobile user security require the mobile user to specially configure the security software on the mobile machine. However, this makes the security software more difficult to install and use which is undesirable. To encourage widespread use of secureIP on a variety of machines, it is desirable that the software devices install out of the box, without significant effort to specially configure the software.

Prior solutions, including SKIP and similar IP security protocols, offer support for mobile hosts by either assigning them a permanent ID (called a master key ID or MKID in SKIP) that is stored in the mobile machine and is transferred with every IP packet. Alternatively, a new security association may be established each time a new mobile IP address is acquired. Although these solutions prevent an intruder with a hijacked IP address from reading encrypted packets, they do not solve the problem of address hijacking so long as the gateway allows the mobile host to send data in the clear. In these cases, the intruder may set the MKID field to zero to force communication in the clear while the security association is maintained by the gateway.

Moreover, this approach does not allow machines on the internal network to find out whether the incoming link is secure. The gateway holds the list of authorized addresses and performs the encryption/decryption functions. This information is not transmitted or shared with the internal network devices. Hence, the internal network machines cannot tell from examining the header of a received packet whether the packet was from a secureIP link or received in the clear. It would be useful for the internal devices to be aware of this information so that they could take intelligent action in response to receiving a packet with unexpected security properties.

Another approach uses "firewalls" which give the capability to do address translation for topology hiding. This hinders non-authorized user's efforts to find out about the structure and potentially vulnerable points of the internal network. Although this approach makes address hijacking less effective, it does not prevent its occurrence. Another solution relies on control messages transmitted from mobile hosts to establish IP tunnels. These tunnels provide a mechanism needed to redirect data addressed to the mobile host to a dynamically assigned IP address. Tunnels hinder address hijacking by encrypting packet header information as well as the packet payload, but are difficult to set up and require complex security management mechanisms.

The Internet Engineering Task Force (IETF) working groups for mobile IP have focused on one potential solution for the support of mobile hosts in the current Internet structure. For this, mobile hosts get assigned a "home IP address", and a temporary routing address that is used to address traffic. In the gateway from the mobile network to the traditional Internet, address translation and rerouting may be performed, such that the mobile node appears to be reachable on its home address at all times. This approach can result in a security risk if a request message was sent by a hosts that had hijacked the dynamic IP address without cryptographically verifying the authenticity of such messages. In order to avoid this risk, all request messages transmitted by a mobile host to the secure network must be authenticated using a message authentication code such as, for example, the keyed-MD5 algorithm.

A need exists for a security method and system that support mobile hosts in a public network that solves the security risks created by dynamic IP address assignment to prevent an external machine from impersonating a secured machine, allow internal machines to detect whether the outside machine is coming in using a secured connection, and enable the system to be easily configured and used such that it can bootstrap with little or no user intervention. Desirably, the security method and system can be implemented without access control lists, timers, or other complex security management systems such that it is compatible with load balancing mechanisms.

SUMMARY OF THE INVENTION

Briefly stated, the present invention involves a method for secure data communication between an inside network with a mobile machine in which a data packet is received from the mobile machine having a particular network address. A pool of secure addresses is established and a data structure is created to hold address translation associations. Each association is between a particular network address and a particular one of the secure addresses. If the received data packet is a secure data packet an association between the received data packet's network address and a secure address in the data structure is identified and the data packet's network address is translated to the associated secure address before forwarding the data packet on to higher network protocol layers. When the received data packet is not secure it is passed it on without address translation to the higher network protocol layers.

When packets are received by the gateway from the inside network, and are addressed to a secure address, then the secure address is replaced by the corresponding network address and the packet is encrypted and authenticated. As used herein, the term "securing a packet" means authentication and/or encryption—and not necessarily encryption only. In this manner, bidirectional secure communications are supported.

DETAILED DESCRIPTION OF THE PREFERRED EMBODIMENTS

The present invention is described in terms of a method and apparatus implemented in conjunction with the SKIP secure Internet protocol system. However, it should be understood that the essential teachings of the present invention may be applied to other environments where network addresses are globally unique (i.e., only one user is able to use a given address at any given time) and where security is performed at the ISO/OSI network layer.

The present invention employs a combination of dynamically enabled address translation together with packet encryption and authentication to achieve a secure data connection between an "inside" secure network and a mobile host. Optionally, a dynamically filled access control list (ACL) is used in combination with the address translation. Both unsigned Diffie-Hellman (uDH) keys and X.509 certificates may be used to identify mobile hosts. This prevents an insecure machine from hijacking the identity of a secure machine and allows machines on an internal secure network to detect whether an outside host is using a secure connection.

A policy to accept uDH certificates without further analysis enables the system to be easily accessed by users in a secure manner, as the administrator does not have to authenticate the unsigned keys for them to be used. Although uDH certificates are not by themselves associated with a particular machine, and therefore are less secure than X.509 certificates, the present invention augments the uDH key with an assigned secureIP address. The unsigned uDH certificates can be upgraded at a later time to X.509 certificates by a system administrator with or without user involvement. This makes the system easy to use without significant user involvement and readily upgradable to provide improved security using X.509 certificates, or the equivalent.

Figure 1:
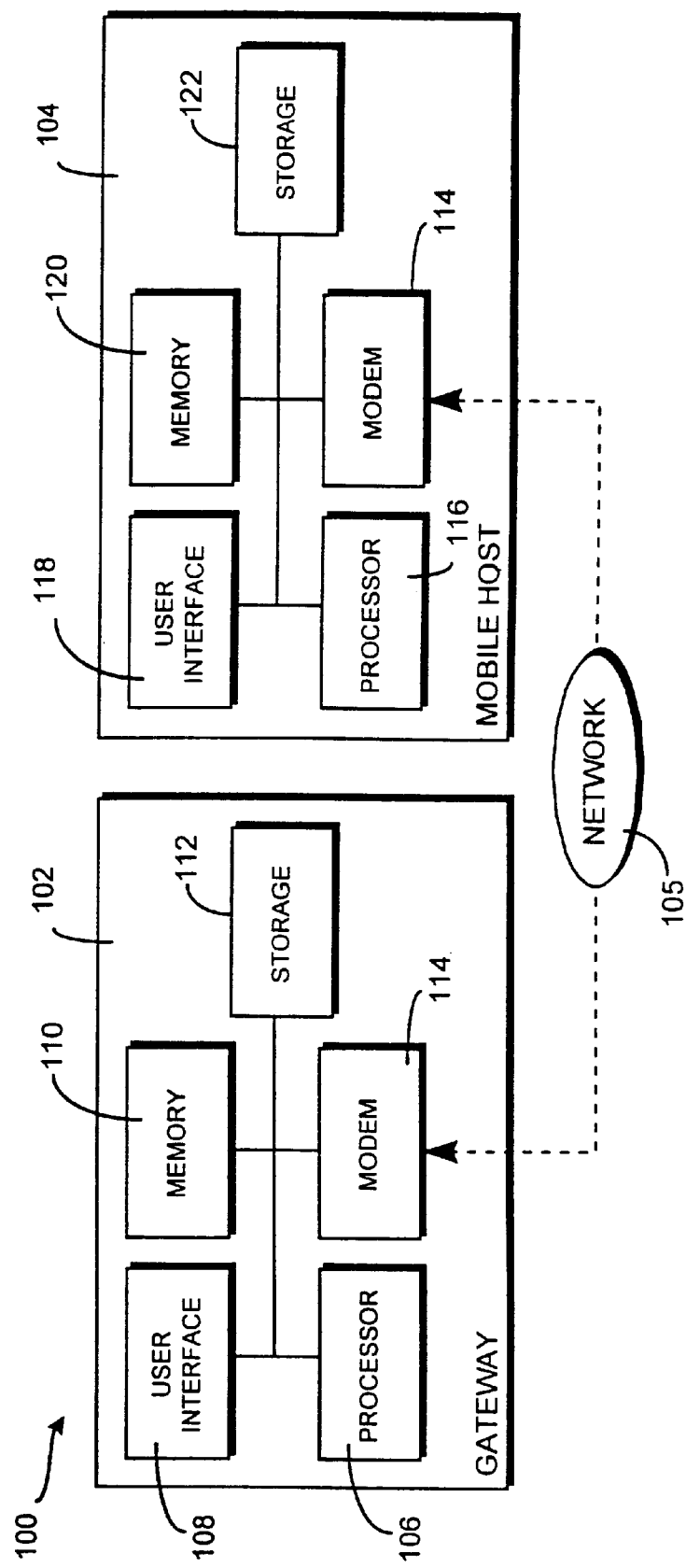
FIG. 1 illustrates a computer equipment programmed to implement the method and system in accordance with the present invention.

FIG. 1 illustrates a computer system 100 configured to implement the method and apparatus in accordance with the present invention. A gateway computer 102 receives data communications in the form of data packets from mobile host computer 104. Gateway computer 102 comprises a processing unit 106 for executing program instructions that is coupled through one or more system busses to a user interface 108. User interface 108 includes available devices to display information to a user (e.g., a CRT or LCD display and the like) as well as devices to accept information form the user (e.g., a keyboard, mouse, and the like). A memory unit 110 (e.g., RAM, ROM, PROM and the like) stores data and instructions for program execution. All or part of memory unit 110 may be integrated with processor 106.

Storage unit 112 comprises mass storage devices (e.g., hard disks, CDROM, network drives and the like). Network adapter 114 converts data from the system bus to and from a format suitable for transmission across public network 105. Network adapter 114 also supports communication with an internal secure network 107. A system may include more than one network adapter 114 to provide a desired level and type of network connectivity. Network adapter 114 is equivalently substituted by a modem or other analog, digital or mixed analog-digital adapter for a communications network.

Mobile host 104 typically comprises a similar group of components including a processor 116, a user interface 118, and host memory 120. Mobile host storage 122, in a particular example, stores programs and data that are transmitted via modem 124 through public network 105 to gateway machine 102. In operation, mobile host 104 accesses secure network 107 through gateway machine 102.

It should be understood that a typical environment will support any number of other devices including workstations, servers, personal computers, and peripheral devices coupled to internal network 107. Each device coupled to internal network 107 is identified by a locally unique network address. Any or all of such devices may be accessible via public network 105 using gateway machine 102. Also, a typical environment will include a plurality of mobile hosts similar to mobile host 104 as well as static hosts that are coupled to public network 105 using permanent network addresses. Each device coupled to public network 105 is identified by a globally unique network address. Devices coupled to internal network 107 can access devices coupled to public network 105 through gateway machine 102.

Figure 2:
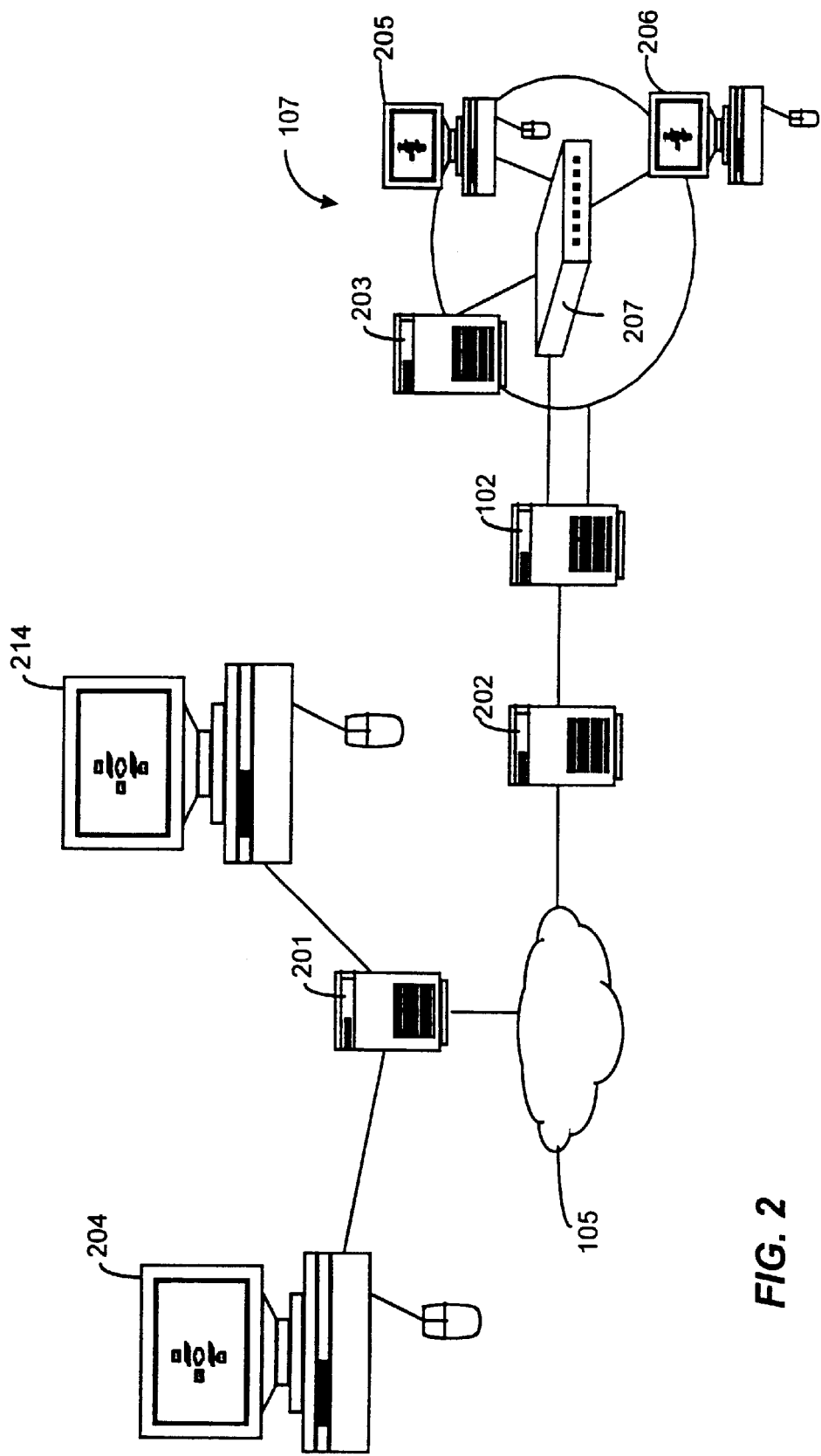
FIG. 2 illustrates a network computer environment implementing the method and system in accordance with the present invention.

FIG. 2 shows an exemplary communication environment such as an Internet environment wherein public network 105 is accessed via service provider (e.g., Internet service providers (ISP) or online service provider) through machines 201 and 202. Service provider machines 201 and 202 are essentially programmed general purpose computers similar to that shown in FIG. 1 that are optimized to provide a plurality of connections to mobile user machines 204 and 214 as well as static users such as secure network 107. Service provider machines accept connection requests and authenticate user's access rights to public network 105.

In a typical environment, some users have permanently assigned (i.e., static) network addresses while others have network addresses that are dynamically assigned by a service provider machine 201 or 202 from a pool of network addressed "owned" by the service provider. In this manner, the service provider can reassign and reuse network address space and need only own sufficient network address space to support the maximum number of concurrent user's. Of particular interest in the understanding of the present invention is that mobile user 204 may be assigned a network address by service provider machine 201. After mobile user 204 logs off, that same network address may be dynamically assigned to mobile user 214.

Ordinarily mobile users 204 and 214 do not control the dynamic assignment of IP addresses and so cannot control which address will be received. However, an intruder using, for example, mobile user machine 214 can use several techniques including collusion with service provider machine 201 to increase the likelihood of receiving an IP address previously in use (or even currently in use) by mobile machine 204. As described in greater detail hereinafter, if mobile machine 204 has established a security association with secure network 107, the intruding mobile machine 214 can gain access privileges that it is not authorized to possess. The present invention operates to prevent such unauthorized access enabled by address hijacking.

Secure network 107 accesses insecure network 105 through a gateway machine 102. Gateway machine 102 has a secure port coupled to secure network 107 (also called a secure subnet 107) and an insecure port coupled to insecure network 105 through, for example, service provider machine 202. Each device coupled to secure network 107 such as server 203, workstation 205, workstation 206 and gateway machine 102 has a unique network address used to route information within the secure network 107. Optional hub 207 provides interconnection between machines coupled to secure network 107. Gateway machine 102 serves to pass data in the form of data packets having a header portion and a payload portion, between machines coupled to secure network 107 and machines coupled to public network 105.

The data packets passing through gateway machine 102 may be secure, such as SKIP packets, or may be in the clear. For general applicability it is necessary that gateway machine 102 pass insecure packets without impediments while appropriately analyzing secure packets and performing the required encryption/decryption function in analysis device 303. Data packets include header information that includes a destination address identifier indicating a unique network address, either on the secure subnet or the insecure subnet, that is intended to receive the data packet. Other fields may include key information used for encryption/decryption and authentication purposes.

Figures 3, 4:
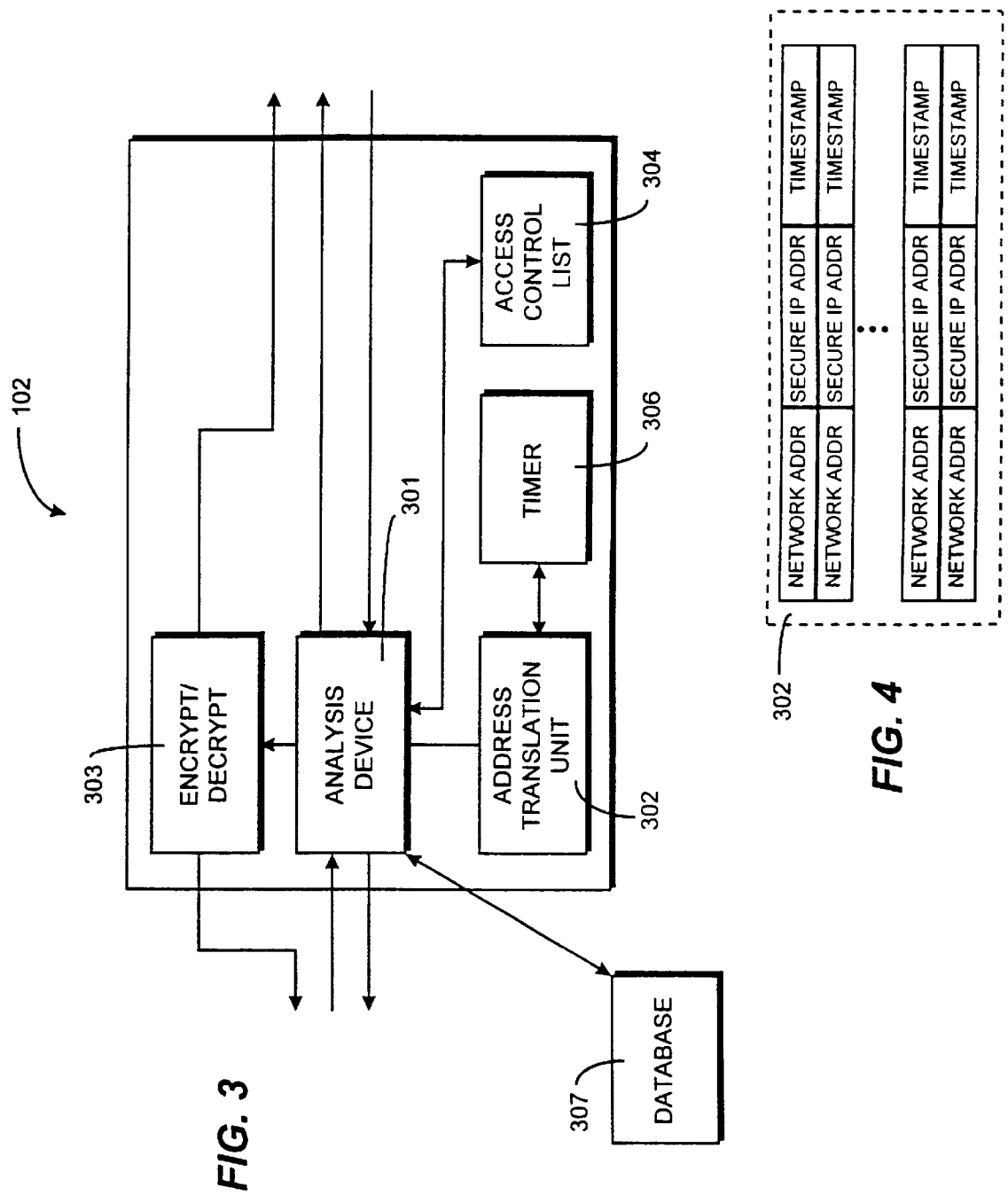
FIG. 3 shows in block diagram form essential components of a gateway machine in accordance with the present invention.
FIG. 4 shows an example address translation data structure in accordance with the present invention.

Gateway machine 102 includes a packet analysis device 301, shown in FIG. 3, that monitors addresses of inbound and outbound packets to machines outside of secure network 107. The present invention operates by selectively routing packets based upon whether the as-received packet header includes an address that is stored in an entry of address translation unit 302. Address translation unit 302 includes a data structure holding address pairs associating a "secureIP" address with a real network address (e.g., an IPv4 or IPv6 address) as shown in FIG. 4. Optionally, each entry may include a timestamp or other state data or metadata useful for particular applications. As the term is used herein, a "secureIP" address is an address that can be formatted similarly to an IP address, but that is assigned by the gateway machine 102 dynamically once the gateway machine has authorized a particular mobile host. Gateway machine 102 has a pool of secureIP addresses (e.g. a reserved class c subnet or the 10.* net or an equivalent) from which it can assign the secureIP address to a particular address pair. They are chosen and controlled by the network administrator operating gateway machine 102. Anybody inside the gateway receiving such an address can be assured that the link on the outside is not in the clear. Desirably, two separate address spaces are used for the secureIP address, one for uDH certificates, one for X.509 type certificates.

In general the present invention operates by assigning a secureIP:network address pair in address translation unit 302 based upon the key material of the received packet when a security association is established. The key material is a value assigned to the entity holding the key such as the "master key" used in SKIP, as well as a uDH key or x.509 key discussed above. It is presumed for purposes of the present invention that each key is unique (i.e., no two mobile hosts use the same key at the same time). In SKIP, the master key is associated with a Master Key ID (MKID) that is transmitted in the SKIP header of a data packet.

The address pair is maintained by updating the network address whenever a secure packet is received with the same key material as an existing address pair. That is to say, if Host A is sending secure packets from IP address "1.2.3.4", address translation unit 302 creates an address pair having an assigned secureIP address (e.g., "7.7.7.7") associated with the network IP address 1.2.3.4. When Host A later connects through a different IP address (e.g., 1.2.3.5) using the same key material (e.g., an MKID associated with Host A), the address pair is updated from "7.7.7.7:1.2.3.4" to "7.7.7.7:1.2.3.5". In this manner, the address pairs maintained by address translation unit 302 always include the network IP address from which the last secure packet was received from Host A. The address pair is the only state information that needs to be kept, although other state information may be included for particular applications.

When Host A stops sending secure packets the address pair entry may eventually be removed from the address translation device 302 indicating that a security association with this IP address no longer exists. Host A can reestablish a security association at any time using the key material known to host A, however, an intruder that does not know this key material cannot establish a security association from the same IP address.

It should be noted that while the address pair created by address translation unit 302 includes the network address of the received packet, that information does not authorize access from any machine sending packets from that IP address. Unlike prior ACL-type security techniques, the address pair in address translation unit 302 serves to map packets addressed to the secureIP address to the associated network address, but does not directly affect encryption/decryption. If an address pair exists in address translation device 302 it is known to have come from a machine that was sending secure packets and so encyrption and authentication must occur using encrypt/decrypt unit 303. In this manner, gateway machine 102 maintains a security association in which the network IP address follows the unique key material that is associated with a particular machine in contrast to prior implementations in which the network IP address was permanently or semi-permanently authorized once a security association was established.

The secureIP address is a unique address assigned to a particular machine, or more accurately, to the key held by a particular machine. When the gateway machine receiving a data packet has an address pair for a particular key the sending machine is said to be "known" to the gateway machine. As described below, the address pairs in address translation unit 302 are dynamically assigned and maintained.

In operation, as a data packet is received the protocol field of the IP header (or the equivalent) for each incoming packet is examined to determine if the packet is secure. For example, SKIP packets are identified by a "57" in the protocol field. Packets that are received in the clear are passed on transparently to higher protocol layers in a conventional manner. Similarly, outbound packets that are received by gateway 102 in the clear are passed on transparently. In accordance with the present invention, data packets sent in the clear do not require address translation and so will not have an address pair entry unless secure packets were earlier received from the same IP address.

When an incoming packet is identified as secure (e.g., by having an appropriate value in the protocol field of the packet's IP header), the key is extracted from each packet by analysis device 301. The gateway machine 102 next determines if the extracted key is known to the gateway machine. Analysis device 301 uses the key to find or determine the corresponding secureIP address. If an address pair does not already exist the public key of the sending machine is retrieved from the sending machine itself, or from database 307. Database 307 may be a local database or a remote central depository using certificate discovery protocol (CDP).

Optionally, an access control list 304 may be used in conjunction with the address translation mechanism in accordance with the present invention to verify that the outside machine is an authorized user by checking whether the outside machine's address exists in access control list (ACL) 304. The use of an ACL, however, will carry with it some of the inherent limitations of ACL technology such as limiting load balancing performance.

Gateway machine 102 assigns a SecureIP address to each machine that sends secure data packets. All devices within secure network 107 use this locally unique address as the destination address for packets intended for delivery to a secure mobile machine 204 or 214. For secure packets, address translation device 302 (e.g., a lookup table, address cache, content addressable memory or the like) translates the locally unique secure address to the appropriate real network address. Analysis device 301 also executes encryption/decryption unit 303 to encrypt outgoing packets and decrypt incoming packets. The data packet is sent on with the translated address.

Gateway machine 102 may maintain database 307 for storing key certificates such as unsigned Diffie-Hellman keys (uDH) and X.509 key certificates. Database 307 maintains key information and historical security association information for outside machines (e.g., mobile machine 204 and 214). Database 307 also maintains a secure locally unique address, such as a secureIP address, associated with each key information entry. In this manner, database 307 enables a prior security association to be reestablished whenever a secure data packet is received for which key information already exists in database 307.

In prior implementations address translation for outgoing data packets was performed indefinitely on the assumption that the translation remained valid for so long as packets continue to be received from and/or sent to the specified globally unique address. However, this allowed the secure network to continue sending data packets to a network address even after another machine had taken over that address. In accordance with the present invention, address translation device 302 is not used for packets that are received in the clear, without regard to the IP address from which the insecure packet was received. Hence, even though a packet is received from an IP address for which a security association exits, it is not remapped to the secureIP address when the packet is received in the clear.

Devices on the inside network communicate with the secure mobile host using the secureIP address stored in address translation unit 302. Address translation unit 302 translates the secureIP address to a real network address (e.g., IPv4 or IPv6 addresses). For all traffic addressed to a secureIP address the packet's data or payload of the packet is encrypted. Packets that are addressed directly to real network addresses pass through in a conventional manner.

In a preferred implementation gateway machine 102 continues to enable address translation to a particular IP address for outgoing packets for a limited time after gateway 102 stops receiving secure packets from that IP address. Because any packets addressed to that secureIP address will be encrypted using the legitimate host's key information, there is no difficulty in continuing to send out data to the IP address even if that IP address has been hijacked as the intruder will not have the legitimate host's key information. If the legitimate host begins to send secure packets again, the timer 306 can be reset (if it has not expired) and address translation will continue. If the preselected time has already expired, the security association must be reverified and a new address translation entry set up. This enables a legitimate host to send both secure and clear packets with minimal overhead required to maintain the security association.

Figure 5:
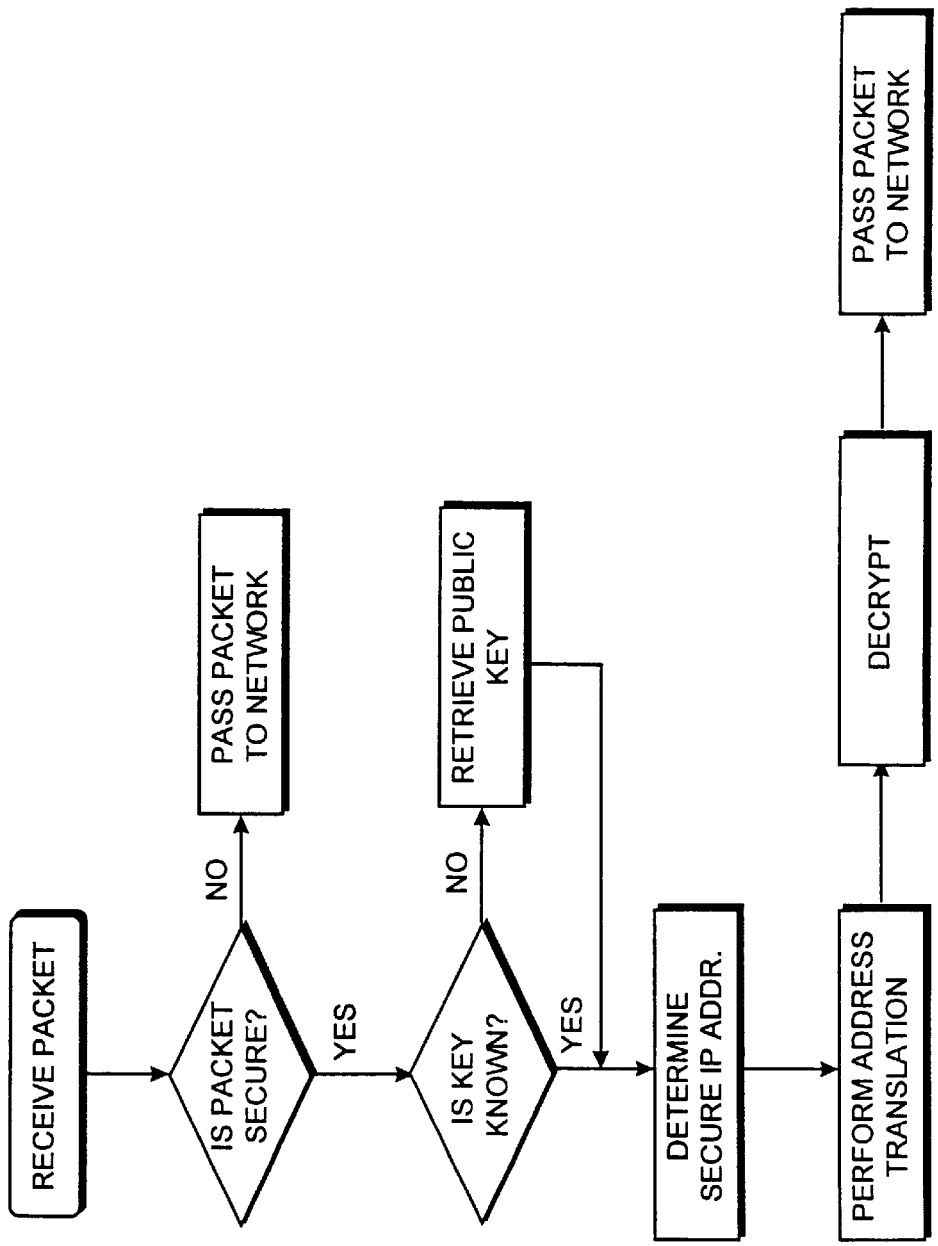
FIG. 5 shows a flow diagram of steps for processing inbound data in accordance with an implementation of the method and system of the present invention.

Operation of the method and system in accordance with the present invention are conveniently understood in terms of processing incoming and outgoing data packets. Essential steps are described in reference to the flow diagrams shown in FIG. 5. For any incoming data packets, gateway machine 102 will determine if the data packet is secure (e.g., a SKIP packet) or received in the clear. Packets that are received in the clear are passed on transparently to higher network levels for routing to specific devices within secure network 107. For packets that are received in the clear, address translation is not performed.

When the received data packet is secure (i.e., the machine sending the packet is using SKIP) it will include key information that enables gateway 102 to determine its public key values. This key information typically is not the key itself as transmitting a key with each packet adds an unacceptable amount of overhead and leads to an undesirable amount of exposure for the key. Instead, the key information typically comprises an key identification such as the SKIP NSID/MKID information that is relatively compact.

The process in accordance with the present invention determines if the key is known to the gateway machine. If the key was recently used it may be available in a cache, register, or local memory (not shown). If not, the public key corresponding to the sending machine's address is obtained from database 307 or via certificate discovery protocol (CDP). In a preferred implementation, when both an uDH and a X.509 key are available, the x.509 key is preferentially used. As a part of obtaining a key, the system desirably verifies that there is no revocation or access denied or other invalidation for this key that is known to the gateway machine.

Once a public key is obtained, the process continues by obtaining or assigning a secureIP address to the machine sending the data packet. When the public key information is an X.509 key certificate the address stored in the certificate is used as a secureIP address assigned to the entity holding the key certificate. When the public key information is a uDH key certificate database 307 will include a record of a previously assigned secureIP address corresponding to this certificate. If a secureIP address has not been previously assigned, gateway machine 102 assigns and stores a secureIP address in address translation device 302. Where each certificate entry in address translation device 302 includes a timestamp, this is updated. At this point, the gateway machine 102 knows the key for the machine, and a secureIP address.

At least three ways to handle the address translation entries. These optional methods serve to maintain the address translation table and clear out old, unused entries. These methods include:

1) If the total number of concurrent users is smaller than the available address space—then it is not necessary for address translation entries to time out. The gateway may hold address translation entries for all of the concurrent users, and just remember the latest used association of secureIP address (and key information) with the incoming network address.
2) In a second case, the time when the last secure packet came in is remembered by, for example, storing a time stamp with each entry in address translation unit 302. As soon as a sufficiently long time (e.g., one hour) has passed without receiving any incoming secure packets from that network address, then the address translation entry for that host is removed or invalidated from the address translation table. In this case the address translation mechanism includes devices for monitoring the timestamps on each entry and expiring, invalidating or removing old entries.
3) In a third case, a timer 306 is started when a packet is received in the clear from an IP address for which an entry exists in address translation unit 302. Timer 306 will cause address translation for this machine's address to expire after a preselected time has elapsed. When subsequent secure packets come are received from the same machine address, timer 306 is reset so that address translation does not expire. In this manner, the present invention operates something like a watchdog timer that halts address translation unless a secure packet is received within a time period defined by timer 306.

Figure 6:
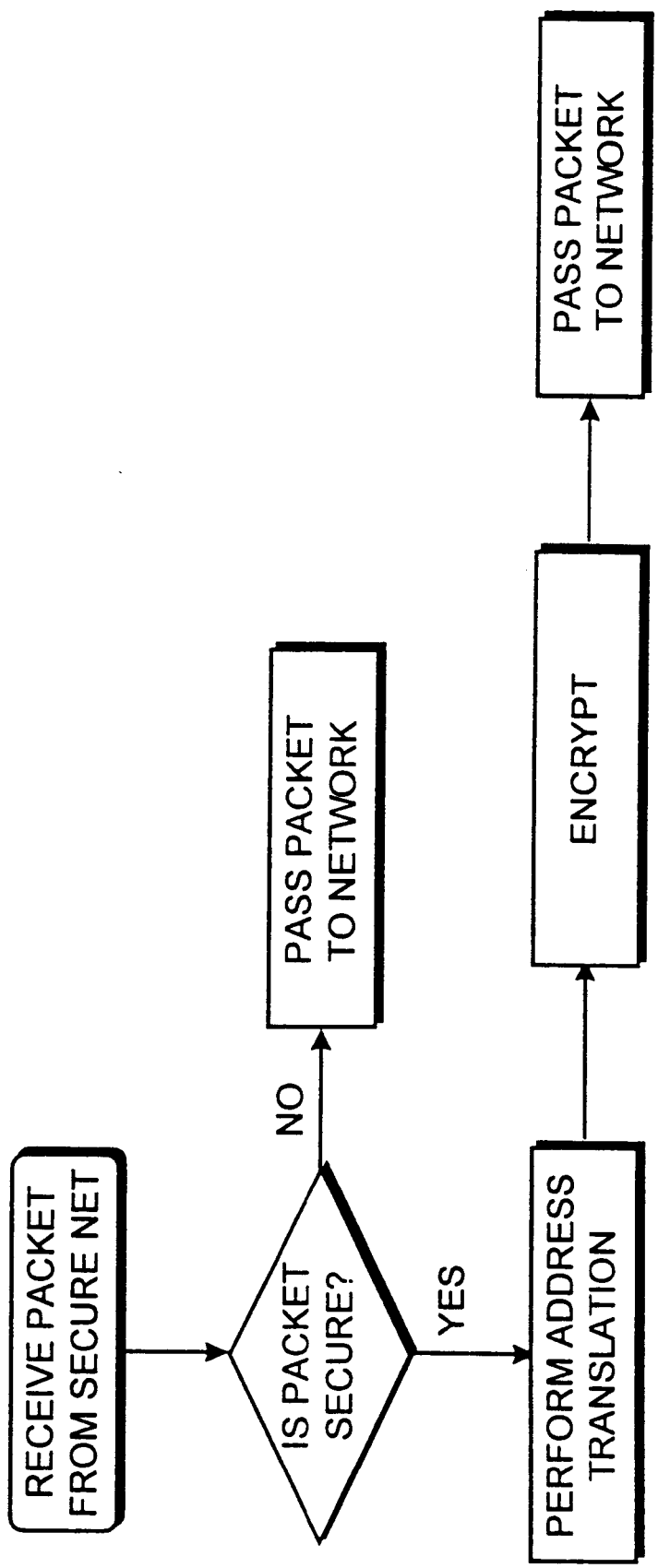
FIG. 6 shows a flow diagram of steps implemented to process outbound data in accordance with the present invention.

Steps involved in outbound packet processing are shown in FIG. 6. For packets addressed to a secureIP address in translation device 302, the secureIP address is thereafter translated to the real, dynamically assigned network address held by the outside machine 202 or 204. In the case of SKIP secure packets, address translation is set up from this NSID/MKID address on the outside to the secureIP address on the inside. Whenever an network IP address is translated to a secureIP address that has been previously used, the older entry is removed.

For all incoming secured traffic, addresses are translated to the secureIP address, decryption performed, and the data packets are sent on to internal network 107. All incoming data packets from the outside that claim to come from a secureIP address are filtered out and discarded. Because the secureIP address pool is known only to the internal network 107, no external device should be able to use that secureIP address, including the machine to which it is assigned.

For outgoing traffic, if the traffic goes to a normal outside address (e.g., a non-secureIP network address such as an IP address), it is passed on to the public network 105 unmodified, without any address translation. When an outgoing data packet is addressed to a secureIP address the address translation is performed as described above. In cases where there is no mapping in the address translation device 302, the packet is discarded.

In a particular implementation, to further large availability, each mobile host is preconfigured with SKIP (or an equivalent security protocol), CDP running, and one strong DH key pair generated during system configuration. To begin using the SKIP gateway, these machines just send SKIP packets. The gateway will fetch the uDH certificate from them, and actually start using it immediately (unless otherwise configured by the gateway administrator). If more a persistent security association is desired, the gateway administrator signs the mobile host's public key, thereby binding the secureIP address to the public key value in a strong manner. The mobile host user is not involved, unless the gateway administrator wants to confirm an identity, which can be added to the certificate.

Machines on the outside (assuming they all have differing keying material) simply can not interfere with each other. If the dynamic IP address is relocated to another host using a secure connection, the change can be detected due to differing MKID's and thus address translation easily switched over by updating the address pair entry in address translation device 302 (e.g., new secure IP address and new keying material assigned to this network address). If a change from non-SKIP to SKIP machine occurs, the connection can easily upgrade by creating an address translation entry where none existed for the non-SKIP machine.

If an address from which SKIP packets have been received begins to talk in the clear, the incoming packets are passed on with their outside address. Outgoing packets to this address will pass unhindered, and in the clear. If there are still SKIP packets on the way to the outside, they will be mapped to the same address, SKIPed and forwarded. This does not compromise security because the non-SKIP machine will just throw those packets away.

Because address translation and encryption/decryption remain in control of the legitimate host, the legitimate host can immediately talk in cleartext to the internal network while an intruder trying to throw an outside host into cleartext mode will fail. The legitimate host will go on doing SKIP (or equivalent security operation), get address translation and the translation will not expire. Even if address translation does expire it will simply be reestablished when the legitimate host begins sending secure packets later.

In an optional embodiment, secureIP addresses assigned to uDH key certificates can be expired some time after they were last used, allowing reuse of the pool. This expiration is in the order of days or weeks. This is a mater of convenience as it cleans up the database making it smaller by removing information about secureIP addresses that are no longer in use.

One potential attack involves an intruder trying to cause a denial of service failure in gateway 102. In such an attack, an intruder could have assembled a large number uDH certificates that are sent to the gateway 102. This would cause gateway 102 to assign secureIP addresses from its pool to the uDH certificates and may exhaust the available pool of addresses. This attack does result in a partial denial of service to legitimate hosts attempting to establish a security relationship with the gateway using uDH certificates that are not yet assigned to secureIP addresses. However, existing connections that have assigned secureIP addresses stay up, and newcomers having X.509 certificates can also continue to connect. Only hosts relying on uDH where no address assignment has taken place yet would fail to connect. This type of attack is detectable, and non-fatal.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for secure data communication with a mobile machine comprising the steps of:

establishing a pool of secure addresses;

receiving a data packet from the mobile machine, the data including a particular network address for the mobile machine;

creating a data structure holding address translation associations wherein each association is between a particular network address and a particular one of the secure addresses;

determining if the received data packet is a secure data packet;

when the received data packet is a secure packet, identifying an association between the received data packet's network address and a secure address in the data structure; and translating the data packet's network address to the associated secure address before forwarding the data packet on to higher network protocol layers, wherein when the received data packet from the particular network address is not secure, passing it on without address translation to higher network protocol layers and terminating address translation for the particular network address after a preselected time interval.

2. The method of claim 1 further comprising:

receiving a subsequent data packet from the mobile machine, the subsequent data packet including the particular network address;

determining if the subsequent data packet a secure packet; and when the subsequent data packet is a secure packet, resetting a timer that measures time during the preselected time interval.

3. The method of claim 1 wherein the step of identifying an association between the received data packet's network address and a secure address in the data structure further comprises:

examining the data structure to determine if an association for the particular network address is already stored in the data structure.

4. A method for secure data communication with a mobile machine comprising the steps of:

establishing a pool of secure addresses;

receiving a data packet from the mobile machine, the data including a particular network address for the mobile machine;

creating a data structure holding address translation associations wherein each association is between a particular network address and a particular one of the secure addresses;

determining if the received data packet is a secure data packet;

when the received data packet is a secure packet, identifying an association between the received data packet's network address and a secure address in the data structure, determining a public key for the received data packet, determining whether the public key is already associated with one of the secure addresses and, if so, using the already assigned secure address to create an association in the data structure, and when the public key is not associated with one of the secure addresses assigning one of the secure addresses from the pool of secure addresses to create an association in the data structure; and translating the data packet's network address to the associated secure address before forwarding the data packet on to higher network protocol layers.

5. The method of claim 4 wherein the step of determining a public key comprises requesting the at least one key from a local database.

6. The method of claim 4 wherein the step of determining a public key comprises requesting the public key using certificate discover protocol (CDP).

7. The method of claim 4 further comprising a step of verifying that the public key is not revoked and not invalidated.

8. The method of claim 4 wherein when the public key is an X.509 key certificate.

9. A method for secure data communication with a mobile machine comprising the steps of:

establishing a pool of secure addresses;

receiving a data packet from the mobile machine, the data including a particular network address for the mobile machine;

creating a data structure holding address translation associations wherein each association is between a particular network address and a particular one of the secure addresses;

determining if the received data packet is a secure data packet;

when the received data packet is a secure packet, identifying an association between the received data packet's network address and a secure address in the data structure;

translating the data packet's network address to the associated secure address before forwarding the data packet on to higher network protocol layers; and discarding all received data packets that contain a particular network address that is one of the pool of secure addresses.

10. A system for secure data communications with a mobile machine comprising:

a gateway machine having a secure port for coupling to a secure network and an insecure port for coupling to an insecure network;

a data structure within the gateway machine holding address translation associations wherein each association is between a particular network address and a particular secure addresses;

an address translation device within the gateway machine coupled to the data structure and operative to translate between a secure address and its associated network address and between a network address and its associated secure address;

an analysis device in the gateway machine for analyzing data packets received from the insecure network to determine whether the received data packet is secure and operative to enable the address translation device when the receive data packet is secure; and means for measuring elapsed time since a packet is received in the clear, wherein the analysis device is coupled to the address translation device to invalidate a selected address translation association in the data structure at a preselected time after a packet is received in the clear from the network address associated with the address translation association.

11. The system of claim 10 wherein a timer that measures time during the preselected time interval is reset upon receiving a secure packet.

12. A system for secure data communications with a mobile machine comprising:

a gateway machine having a secure port for coupling to a secure network and an insecure port for coupling to an insecure network;

a data structure within the gateway machine holding address translation associations wherein each association is between a particular network address and a particular secure addresses;

an address translation device within the gateway machine coupled to the data structure and operative to translate between a secure address and its associated network address and between a network address and its associated secure address; and an analysis device in the gateway machine for analyzing data packets received from the insecure network to determine whether the received data packet is secure and operative to enable the address translation device when the receive data packet is secure, wherein each address translation association in the data structure corresponds to a network address from which no data packet has been sent in the clear since receiving a secure data packet.

13. A system for secure data communications with a mobile machine comprising:

a gateway machine having a secure port for coupling to a secure network and an insecure port for coupling to an insecure network;

a data structure within the gateway machine holding address translation associations wherein each association is between a particular network address and a particular secure addresses;

an address translation device within the gateway machine coupled to the data structure and operative to translate between a secure address and its associated network address and between a network address and its associated secure address; and an analysis device in the gateway machine for analyzing data packets received from the insecure network to determine whether the received data packet is secure and operative to enable the address translation device when the receive data packet is secure, wherein address translation associations in the data structure are dynamically updated in response to receiving a data packet from a network address that has an entry in the data structure but includes new key information.

14. A computer implemented system for secure data communication with a mobile machine operable on a computer system having a processor and data storage devices coupled to the processor, the system comprising:

computer implemented code devices executing on the processor and configured to cause the computer to define a pool of secure addresses;

computer implemented code devices executing on the processor and configured to cause the computer to receive a data packet from the mobile machine, the data including a particular network address for the mobile machine;

computer implemented code devices executing on the processor and configured to cause the computer to create a data structure holding address translation associations wherein each association is between a particular network address and a particular one of the secure addresses;

computer implemented code devices executing on the processor and configured to cause the computer to determine if the received data packet is a secure data packet;

computer implemented code devices executing on the processor and configured to cause the computer to identify an association between the received data packet's network address and a secure address in the data structure when the received data packet is a secure packet;

computer implemented code devices executing on the processor and configured to cause the computer to translate the data packet's network address to the associated secure address before forwarding the data packet on to higher network protocol layers;

computer implemented code devices executing on the processor and configured to cause the computer to respond to receiving a data packet from the particular network address that is not secure by starting a timer measuring time elapsed since the insecure data packet was received; and computer implemented code devices executing on the processor and configured to cause the computer to terminate address translation for the particular network address after a preselected time interval as measured by the timer.

15. The system of claim 14 further comprising:

computer implemented code devices executing on the processor and configured to cause the computer to pass the data packet on without address translation to higher network protocol layers when the received data packet from the particular network address is not secure.

16. The system of claim 15 further comprising:

computer implemented code devices executing on the processor and configured to cause the computer to receive a subsequent data packet from the mobile machine, the subsequent data packet including the particular network address;

computer implemented code devices executing on the processor and configured to cause the computer to determine if the subsequent data packet a secure packet; and computer implemented code devices executing on the processor and configured to cause the computer to reset a timer when the subsequent data packet is a secure packet.

17. The system of claim 14 wherein the computer implemented code devices that identify whether an association between the received data packet's network address and a secure address in the data structure further comprise:

computer implemented code devices executing on the processor and configured to cause the computer to examine the data structure to determine if an association for the particular network address is already stored in the data structure.

18. The system of claim 14 wherein the computer implemented code devices that identify an association between the received data packet's network address and a secure address in the data structure further comprise:

computer implemented code devices executing on the processor and configured to cause the computer to determine a public key for the received data packet; and computer implemented code devices executing on the processor and configured to cause the computer to determine whether the public key is already associated with one of the secure addresses and, if so, use the already assigned secure address to create an association in the data structure.

19. The system of claim 14 wherein the computer implemented code devices that identify an association between the received data packet's network address and a secure address in the data structure further comprise:

computer implemented code devices executing on the processor and configured to cause the computer to verify that the public key is not revoked and not invalidated.

20. A computer implemented system for secure data communication with a mobile machine operable on a computer system having a processor and data storage devices coupled to the processor, the system comprising:

computer implemented code devices executing on the processor and configured to cause the computer to define a pool of secure addresses;

computer implemented code devices executing on the processor and configured to cause the computer to receive a data packet from the mobile machine, the data including a particular network address for the mobile machine;

computer implemented code devices executing on the processor and configured to cause the computer to create a data structure holding address translation associations wherein each association is between a particular network address and a particular one of the secure addresses;

computer implemented code devices executing on the processor and configured to cause the computer to determine if the received data packet is a secure data packet;

computer implemented code devices executing on the processor and configured to cause the computer to identify an association between the received data packet's network address and a secure address in the data structure when the received data packet is a secure packet;

computer implemented code devices executing on the processor and configured to cause the computer to translate the data packet's network address to the associated secure address before forwarding the data packet on to higher network protocol layers; and computer implemented code devices executing on the processor and configured to cause the computer to assign one of the secure addresses from the pool of secure addresses to create an association in the data structure when the public key is not associated with one of the secure addresses.

21. The system of claim 20 further comprising:

computer implemented code devices executing on the processor and configured to cause the computer to pass the data packet on without address translation to higher network protocol layers when the received data packet from the particular network address is not secure.

22. The system of claim 20 wherein the computer implemented code devices that identify whether an association between the received data packet's network address and a secure address in the data structure further comprise:

computer implemented code devices executing on the processor and configured to cause the computer to examine the data structure to determine if an association for the particular network address is already stored in the data structure.

23. The system of claim 20 wherein the computer implemented code devices that identify an association between the received data packet's network address and a secure address in the data structure further comprise:

computer implemented code devices executing on the processor and configured to cause the computer to determine a public key for the received data packet; and computer implemented code devices executing on the processor and configured to cause the computer to determine whether the public key is already associated with one of the secure addresses and, if so, use the already assigned secure address to create an association in the data structure.

24. The system of claim 20 wherein the computer implemented code devices that identify an association between the received data packet's network address and a secure address in the data structure further comprise:

computer implemented code devices executing on the processor and configured to cause the computer to verify that the public key is not revoked and not invalidated.

* * * * *